(12) United States Patent
Sinha Ray et al.

(10) Patent No.: US 11,560,714 B2
(45) Date of Patent: Jan. 24, 2023

(54) CONDUCTIVE PAPER FOR MAKING ELECTROACTIVE SURFACE IN CONSTRUCTION

(71) Applicant: United States Gypsum Company, Chicago, IL (US)

(72) Inventors: Suman Sinha Ray, Chicago, IL (US); Salvatore C. Immordino, Jr., Trevor, WI (US); Mark Joseph, Chicago, IL (US); Terry Rosenstiel, Vernon Hills, IL (US); William White, Grayslake, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 332 days.

(21) Appl. No.: 16/783,469

(22) Filed: Feb. 6, 2020

(65) Prior Publication Data

US 2020/0354955 A1    Nov. 12, 2020

Related U.S. Application Data

(60) Provisional application No. 62/844,535, filed on May 7, 2019.

(51) Int. Cl.
| | |
|---|---|
| *E04C 2/16* | (2006.01) |
| *E04B 5/02* | (2006.01) |
| *E04B 2/00* | (2006.01) |
| *D21H 27/18* | (2006.01) |
| *D21H 13/50* | (2006.01) |
| *B32B 29/00* | (2006.01) |
| *C04B 111/94* | (2006.01) |
| *C04B 111/00* | (2006.01) |

(Continued)

(52) U.S. Cl.
CPC .............. *E04C 2/16* (2013.01); *B32B 29/005* (2013.01); *D21H 13/50* (2013.01); *D21H 27/18* (2013.01);

(Continued)

(58) Field of Classification Search
CPC . E04C 2/16; E04C 2/50; B32B 29/005; B32B 13/08; B32B 2262/106;

(Continued)

(56) References Cited

U.S. PATENT DOCUMENTS

| 1,769,519 A | 7/1930 | King |
|---|---|---|
| 4,853,085 A | 8/1989 | Johnstone et al. |

(Continued)

FOREIGN PATENT DOCUMENTS

| CN | 205642156 | 10/2016 |
|---|---|---|
| JP | 10107478 | 9/1996 |

(Continued)

OTHER PUBLICATIONS

PCT Notification of Transmittal of the International Search Report and Written Opinion dated Jun. 20, 2020 for PCT Application No. PCT/US2020/030981, filed May 1, 2020.

*Primary Examiner* — Frank J Vineis
*Assistant Examiner* — Donald M Flores, Jr.
(74) *Attorney, Agent, or Firm* — Greer, Burns & Crain, Ltd; Philip T. Petti; Pradip Sahu (57) ABSTRACT

A building construction product with an electroconductive surface, the building construction product comprising a core with one or more surfaces covered by an electroconductive paper comprising carbon fibers, the electroconductive paper being attached to the one or more surfaces of the core. Methods and materials for producing the building construction products with an electroconductive surface and products and methods for shielding an area from electromagnetic waves.

5 Claims, 4 Drawing Sheets

(51) Int. Cl.
 *D21H 27/30* (2006.01)
 *B32B 13/08* (2006.01)
(52) U.S. Cl.
 CPC .......... *E04C 2/46* (2013.01); *E04C 2/50* (2013.01); *B32B 13/08* (2013.01); *B32B 2262/106* (2013.01); *B32B 2307/202* (2013.01); *B32B 2419/00* (2013.01); *C04B 2111/00612* (2013.01); *C04B 2111/94* (2013.01); *D21H 27/30* (2013.01)
(58) Field of Classification Search
 CPC .......... B32B 2307/202; B32B 2419/00; D21H 13/50; D21H 27/18; D21H 27/30
 See application file for complete search history.

(56) References Cited

U.S. PATENT DOCUMENTS

| | | | |
|---|---|---|---|
| 5,422,174 A | 6/1995 | Shintani et al. | |
| 5,496,966 A | 3/1996 | Hightower et al. | |
| 5,609,788 A | 3/1997 | Deetz | |
| 6,214,454 B1 | 4/2001 | Kanda et al. | |
| 7,641,764 B2 * | 1/2010 | Yoshida | D21H 13/24 428/172 |
| 7,892,613 B2 | 2/2011 | Meazle et al. | |
| 8,197,952 B2 | 6/2012 | Yu et al. | |
| 8,211,556 B2 | 7/2012 | Guckert et al. | |
| 9,840,851 B2 | 12/2017 | Propst | |
| 10,012,348 B2 | 7/2018 | Ray et al. | |
| 10,189,236 B2 | 1/2019 | Lautzenhiser et al. | |
| 2007/0029307 A1 | 2/2007 | Erickson | |
| 2016/0375673 A1 | 12/2016 | Lautzenhiser et al. | |
| 2017/0226748 A1 | 8/2017 | Meyer | |

FOREIGN PATENT DOCUMENTS

| | | | |
|---|---|---|---|
| NO | WO9916984 A1 | 8/1999 | |
| WO | WO9962076 | 12/1999 | |
| WO | WO-9962076 A1 * | 12/1999 | ............... H01B 1/24 |
| WO | WO0049246 A1 | 8/2000 | |

\* cited by examiner

CONDUCTIVE PAPER FOR MAKING ELECTROACTIVE SURFACE IN CONSTRUCTION

CROSS-REFERENCE TO RELATED APPLICATIONS

This application claims the benefit of priority from U.S. Provisional Patent Application 62/844,535 filed on May 7, 2019, the entire disclosure of which is incorporated herein by reference.

TECHNICAL FIELD

This disclosure relates to construction products comprising an electroconductive surface as well as methods and materials for controlling the electric conductivity and the electromagnetic shielding capacity of a surface in building construction.

BACKGROUND

In building construction, different types of panels are used to form interior walls, exterior walls, roofs, floors and ceilings. Often used in construction of interior walls, is a gypsum board faced with paper, commonly referred as a wallboard. Typically, wallboard (also referred to as drywall or gypsum panel) is made by preparing a slurry comprising calcined gypsum, water and other components. The gypsum slurry is then deposited between two sheets of paper. The gypsum slurry forms a gypsum core between two paper cover sheets after it sets. US Patents such as U.S. Pat. Nos. 8,197,952, 4,853,085, and 1,769,519 relate to gypsum wallboard and methods of making it. Other building constructions products include ceiling tiles, doors, fiberboards, floor tiles and many others.

Under some circumstances, it may be necessary to produce a construction product with an electroconductive surface or to retrofit a construction product with an electroconductive surface. Such products may be used as a shield from electromagnetic waves, such as for example, when radio waves and/or a wifi connection needs to be blocked.

U.S. Pat. No. 5,422,174 discloses an electromagnetic wave shielding building material which comprises a hydraulic inorganic material and carbon fibers of 0.6-3% by weight which is mixed with cement. U.S. Pat. No. 9,840,851 discloses building construction materials, including coatings and layers embedded in or encapsulated by a core, which provide sound attenuation or blockage. WO 99/62076 discloses composites comprising a thin electrically conductive cellulose layer, having the ability to shield electric and high frequency waves. U.S. Pat. No. 8,211,556 discloses a gypsum-based building material which comprises graphite and has the electromagnetic shielding capacity. U.S. Pat. No. 7,641,764 discloses a non-woven fabric for a gypsum board which comprises 20 to 60% by weight of a glass fiber and carbon fiber as a conductive fiber. U.S. Pat. No. 5,496,966 discloses a building absorber which provides a surface for absorbing incident electromagnetic signals of a selected frequency range. The panel absorber includes absorptive layers which are preferably carbon fibers, carbonyl iron powder, or a ferrite material positioned between a top surface and a bottom surface of the absorber.

However, there still exists the need in the field for construction products with an electroconductive surface for which the electroactivity may be controlled and adjusted on demand. There also exists the need for materials and methods with which a construction product can be retrofitted with an electroconductive surface.

SUMMARY

In one aspect, the present disclosure provides a building construction product with an electroconductive surface, the building construction product comprising a core with one or more surfaces covered by an electroconductive paper comprising carbon fibers, the electroconductive paper being attached to the one or more surfaces of the core. The building construction product may a wallboard, a fiberboard, a ceiling tile, a floor tile, a door, a plank, a frame or a roof tile. The building construction product may be a wallboard and the electroconductive paper comprising carbon fibers is applied over at least one of the wallboard long surfaces.

In any of the building construction products of this disclosure, the electroconductive paper cover sheet may be a multi-ply paper comprising a surface ply with the carbon fibers being incorporated in the surface ply. Suitable carbon fibers include long carbon fibers, short carbon fibers or any mixture thereof.

Is some of the building construction products, the paper cover sheet is a multi-ply paper cover sheet comprising a surface ply, and the carbon fibers are incorporated in the surface ply in an amount from 2% to 40% of fibers total per the ply, and wherein the remainder of the fibers in the ply are cellulose fibers.

In some of the building construction products, the carbon fibers are incorporated in the paper cover sheet in a pattern.

In further aspect, the present disclosure provides electroconductive paper comprising a surface ply and one or more filler plies beneath the surface ply, wherein the electroconductive paper comprises carbon fibers at least in the surface ply. In some embodiments, the electroconductive paper may further comprise carbon fibers in the one or more filler plies beneath the surface ply.

Suitable carbon fibers have a diameter in the range from 1 and 15 micrometers (μM) and a length in the range from 1 to 20 millimeters (mm). The carbon fibers may be short carbon fibers, long carbon fibers, or any combination thereof. The carbon fibers may be intermixed with cellulose fibers. Some of the electroconductive paper may further comprise carbon nanotubes.

In some embodiments of the electroconductive paper, the carbon fibers are incorporated in an amount from 2% to 40% by weight of fibers total per the surface ply and the remainder of the fibers in the surface ply may be cellulose fibers.

In some embodiments of the electroconductive paper, the carbon fibers may be in an amount from 2% to 5% by weight of fibers total per the surface ply and the remainder of the fibers in the surface ply may be cellulose fibers. The carbon fibers may be incorporated in the surface ply in a pattern. In some of the electroconductive papers, the carbon fibers in the surface ply are oriented parallel or near parallel to each other.

In further aspects, the present disclosure provides an electroconductive paper screen comprising one or more hanging means and electroconductive paper comprising a surface ply and one or more filler plies beneath the surface ply, wherein the electroconductive paper comprises carbon fibers at least in the surface ply.

In further aspect, the present disclosure provides a method for imparting an electroconductive surface to a building construction product, the method comprising:

a) forming a paper sheet from a paper stock which comprises carbon fibers and/or embedding carbon fibers into the forming paper sheet in a pattern;
b) drying the paper sheet; and
c) attaching the paper sheet to one or more surfaces of the building construction product.

Further aspects of this disclosure include methods for shielding an area from electromagnetic waves, the methods comprise enclosing the area with the electroconductive paper comprising a surface ply and one or more filler plies beneath the surface ply, wherein the electroconductive paper comprises carbon fibers at least in the surface ply.

Other aspects of this disclosure include methods for shielding an area from electromagnetic waves, the methods comprise enclosing the area with the electroconductive paper comprising a surface ply and one or more filler plies beneath the surface ply, wherein the electroconductive paper comprises carbon fibers at least in the surface ply.

Further methods include navigation methods, including indoor navigation, in which navigation is guided by detecting a signal generated by the electroconductive surface of the building construction product of this disclosure.

DETAILED DESCRIPTION

Figure 1:
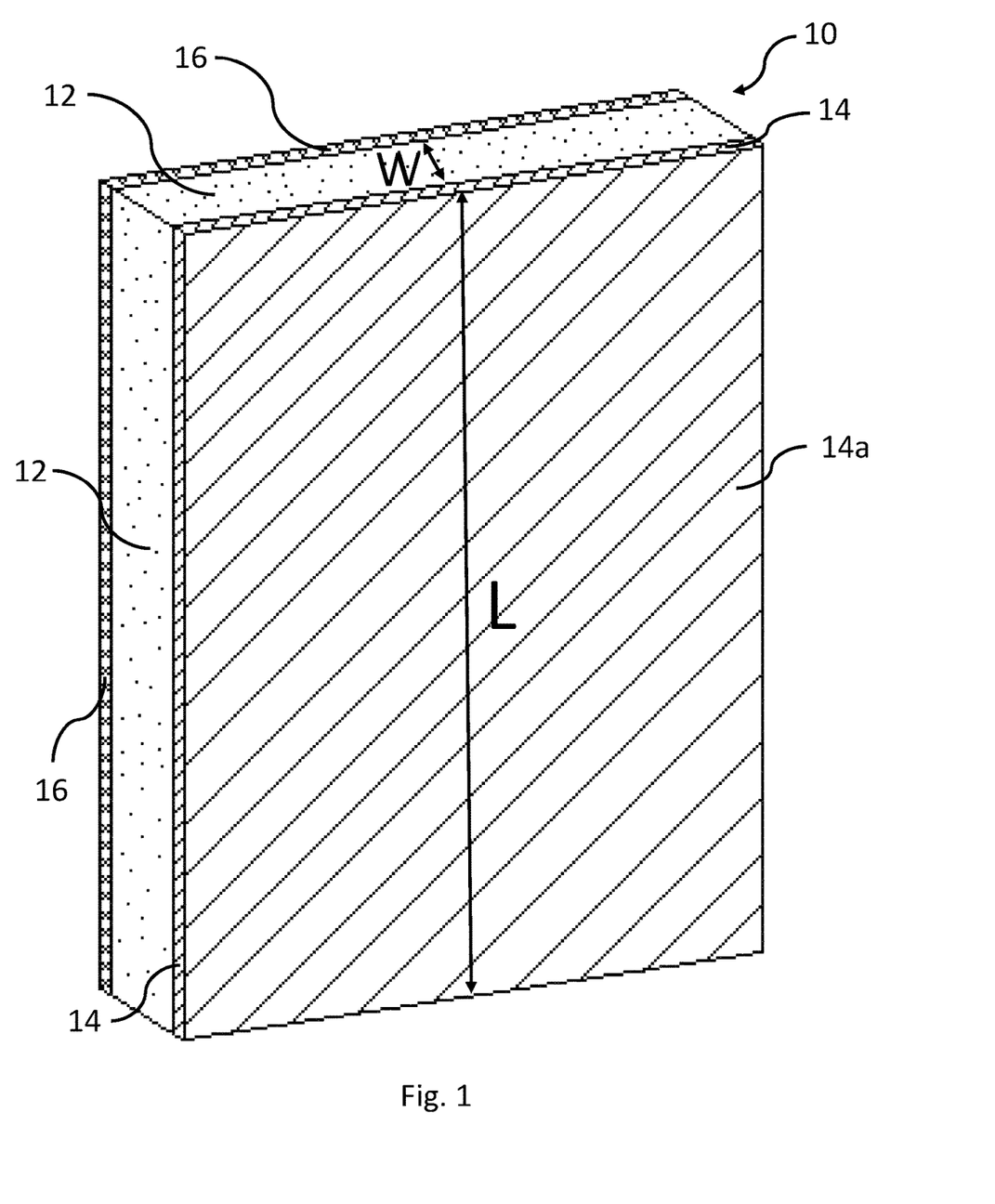
FIG. 1 is a perspective view of a building construction product comprising an electroconductive surface.

In one aspect, this disclosure provides a building construction product comprising an electroconductive surface. As shown in FIG. 1, a building construction product, generally (10), comprises a core (12) covered on one surface with a paper cover sheet (14). The paper cover sheet (14) is electroconductive and comprises carbon fibers. The paper cover sheet (14) is attached (adhered, bonded) to the core (12). The paper cover sheet (14) creates an electroconductive surface (14a) of the building construction product (10).

The paper cover sheet (14) can be attached to the core (12) by any means. The core (12) may comprise a cementitious material and/or an adhesive and the paper cover sheet (14) may be bonded to the core (12) during the setting reaction of the cementitious material. In alternative or an addition, the paper cover sheet (14) may be bonded to the core (12) with an adhesive, e.g. starch, glue, polymeric binders. The paper cover sheet (14) may comprise an adhesive layer and/or an adhesive can be applied to the paper cover sheet (14) and/or the core (12) in order to attach the paper cover sheet (14) to the core (12). In addition, or in alternative, the paper cover sheet (14) may be attached to the core (12) with nails, an adhesive tape, staples, screws or by any other means generally used in construction to attach a paper cover sheet to a surface. In some embodiments, the paper cover sheet (14) may be wrapped around the core (12).

The building construction product (10) may be a wallboard, a fiberboard, a tile, a ceiling tile, a floor tile, a door, a plank, a frame, a roof tile, or any other construction product. In the drawing of FIG. 1., the construction product (10) can be characterized by its length (denoted as "L" in FIG. 1) and a thickness of the core (12) (denoted as "W" in FIG. 1). Since the length "L" is greater than the thickness "W," the construction product (10) has two long surfaces, one of them is the electroconductive surface (14a) shown in FIG. 1.

As can be appreciated from FIG. 1., the building construction product has a second long surface (not shown in FIG. 1) on the opposite side of the core (12) from the electroconductive surface (14a). This second long surface may be covered with a paper cover sheet (16). The second paper cover sheet (16) may be a paper cover sheet which does not comprise carbon fibers or the second paper cover sheet (16) may also comprise carbon fibers and create a second electroconductive surface.

In alternative embodiments, the paper cover sheet (16) may be absent or it may be replaced with a fiberglass mat (not shown in FIG. 1). In the drawing of FIG. 1., the paper cover sheet (16) and the paper cover sheet (14) are applied directly over the core (12). In further embodiments, there may be one or more intermediate layers (not shown in FIG. 1) being positioned between the core (12) and the paper cover sheet (16) and/or the paper cover sheet (14).

The one or more intermediate layers may be one or more of the following: an adhesive layer, a fiberglass mat, an insulation material, another paper cover sheet, a fortifying layer, such as mesh or screed, a coating, a primer, or any combination thereof. In some embodiments (not shown in FIG. 1), the product (10) does not comprise the core (12) and/or the paper cover sheet (16). In these embodiments, the building construction product comprises the paper cover sheet (14) with the electroconductive surface (14a).

In some embodiments, the electroconductive surface (14a) is applied to the front surface of the building construction product which is facing inside an enclosure, e.g. a room, after the building construction product (10) has been installed.

In other embodiments, the electroconductive surface (14a) encloses a facility outside. In these embodiments, the other paper cover sheet (16) is facing inside the enclosure, e.g. a room, while the electroconductive surface is on the opposite side.

The core (12) may be a cementitious core comprising one or more of cement, gypsum and/or any other hydraulic material. The core (12) may further comprise organic and/or inorganic fibers, a binder, organic and/or inorganic fillers and other compounds. In some embodiments, the core (12) is a gypsum core as conventionally used in wallboard, fiberboard or ceiling tiles. In further embodiments, the core (12) may be a plank, a mat, an underlayment, a pipe or any other building construction substrate with one or more surfaces.

The paper cover sheet (14) comprising carbon fibers is referred in this disclosure as the electroconductive paper cover sheet. The electroconductive paper cover sheet of this disclosure is capable of conducting electric current, has a low electrical resistance value and a low electrical resistivity value in comparison to a conventional paper cover sheet, such as for example Manila grade paper cover sheet or any other convention paper cover sheet used in wallboards. These conventional paper cover sheets do not comprise carbon fibers and they have infinite resistance.

This distinguishes the electroconductive paper cover sheet of this disclosure from a conventional paper cover sheet which does not comprise carbon fibers. The conventional paper cover sheet is not a conductive material and it has infinite resistance. The electroconductive paper cover sheet of this disclosure has an electrical conductivity and a good electromagnetic shielding capacity.

In further aspect, the electroconductive paper cover sheet is a building construction product which can be used to create an electroconductive surface on any surface or any portion thereof, including a wall, a partition, a roof, a ceiling, a floor, a window, or a door. In these embodiments, the electroconductive paper cover sheet can be used to retrofit a facility, such as for example a research facility or a conference room, including wall panels that have been already installed. For example, the electroconductive paper cover sheet of this disclosure can be used as a wallpaper to be installed in a room or in any other facility or enclosure.

The electroconductive paper cover sheet of this disclosure may be single-ply paper comprising carbon fibers or multi-ply paper comprising carbon fibers. The electroconductive multi-ply paper may comprise several central filler plies, typically 2 to 5 plies, pressed together with a surface ply.

Figure 2:
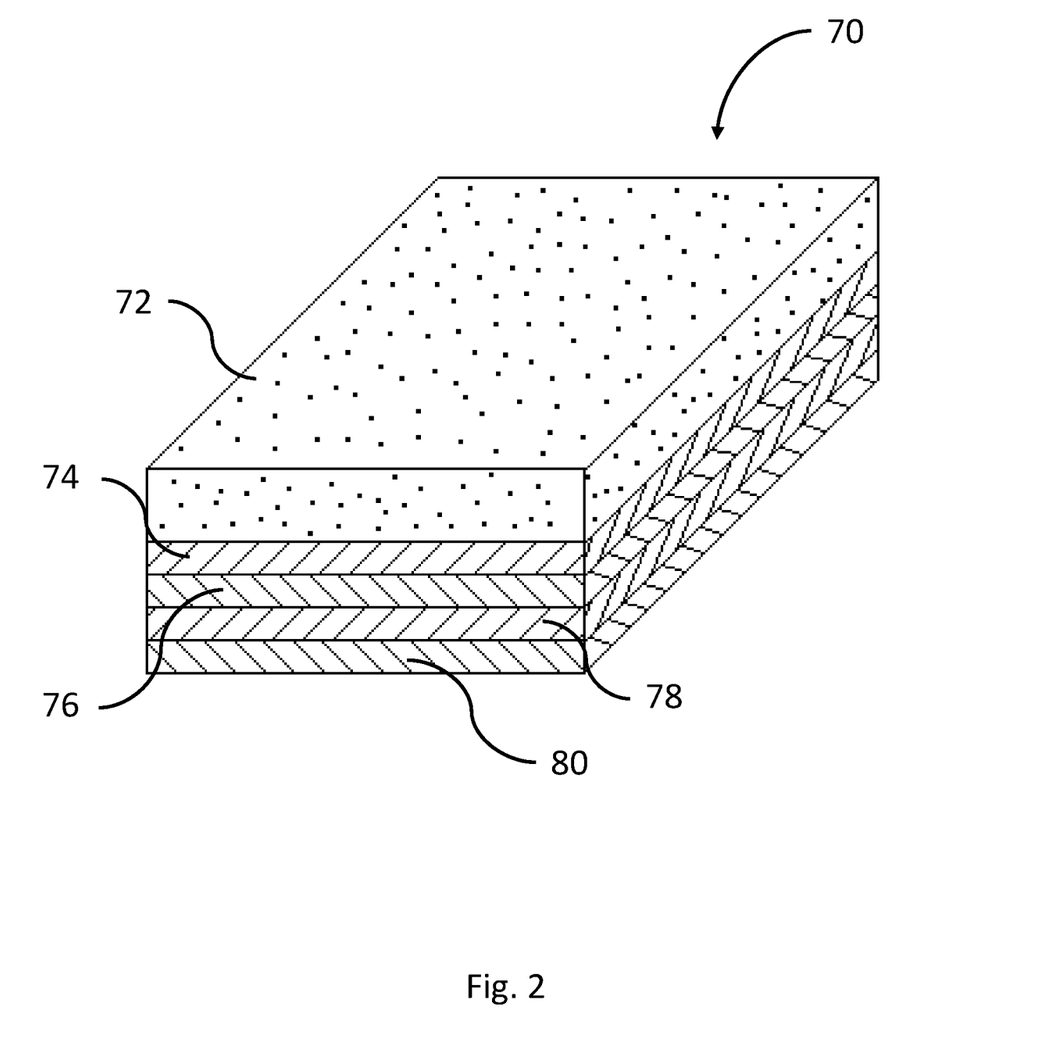
FIG. 2 is a cross-sectional view of an electroconductive multi-ply paper comprising carbon fibers.

Referring to FIG. 2, it depicts a cross-sectional view of one of the electroconductive multi-ply paper comprising carbon fibers according to this disclosure, generally (70). The electroconductive multi-ply paper (70) comprises a surface ply (72) pressed together with several filler plies: (74), (76), (78) and (78) stacked beneath the surface ply (72) in a pile. While in the drawing of FIG. 2, only 4 filler plies are shown, other papers according to this disclosure may comprise more than 4, e.g. 5, 6 or 7 filler plies or fewer than 4, e.g. 1, 2 or 3 filler plies. While in the drawing of FIG. 2, only one surface ply (72) is shown, in other embodiments according to this disclosure, the electroconductive paper cover sheet may comprise a second surface ply positioned as an outer ply on the side opposite to the surface ply (72). In yet other embodiments, the surface opposite to the surface ply (72) which is beneath the ply (80) may be coated with an adhesive coating (not shown in the drawing of FIG. 2). This adhesive coating, when present, facilitates adhesion of the electroconductive paper to the core (12) of the building construction product (10).

In the electroconductive paper (70) of this disclosure, carbon fibers are incorporated at least in the surface ply (72) which will be at the surface (electroactive surface (14a) in FIG. 1) in the building construction product (10) of this disclosure.

In some of the multi-ply electroconductive paper cover sheets, carbon fibers may be incorporated into all plies, e.g. all plies (72, 74, 76, 78 and 80) comprise some carbon fibers, even if an amount of carbon fibers may differ between different plies. In other multi-ply electroconductive paper cover sheets, carbon fibers may be incorporated only in the surface ply (72). In other multi-ply electroconductive paper cover sheets, carbon fibers may be incorporated in the surface ply (72) and in the filler ply (74) which is positioned immediately beneath the surface ply (72). In yet other multi-ply electroconductive paper cover sheets, carbon fibers may be incorporated in the surface ply (72), in the filler ply (74) and in the filler ply (76) which is positioned immediately beneath the filler ply (74). Further embodiments include the electroconductive paper, in which carbon fibers are incorporated in the surface ply (72) and carbon fibers are also incorporated into 1 to 4 of the filler plies stacked beneath the surface ply (72).

In the building construction product (10), the ply (80) is in contact with the core (12) of the building construction product (10). In some embodiments, this ply comprises carbon fibers in addition to or instead of the surface ply (72).

Various electrically conductive carbon fibers are suitable for producing the electroconductive paper cover sheet of this disclosure. Suitable carbon fibers include those produced by any conventional methods from polyacrylonitrile, ryon and/or a pitch comprising aromatic hydrocarbons. The pitch can be plant-based or petroleum-based.

The length and diameter of carbon fibers may vary. Suitable carbon fibers include fibers composed mainly of carbon atoms with a diameter in the range from 1 and 15 micrometers ($\mu$M) and a length in the range from 1 to 20 millimeters (mm). Carbon fibers of other length and/or diameter may be also suitable. The carbon fibers may be coated with a coating comprising one or more chemical compound. The coating may be an organic coating and may comprise polyvinyl alcohol or any other organic or inorganic compound.

The length and/or diameter of carbon fibers in any particular electroconductive paper cover sheet of this disclosure may be adjusted on demand in order to achieve a particular electromagnetic shielding capacity and electrical conductivity as may be needed. For the purpose of this disclosure, carbon fibers with the length less then 10 mm, e.g. 2 mm, 3 mm, 4 mm or 5 mm, are said to be short carbon fibers. The short carbon fibers have a diameter in the range from 1 to 15 $\mu$M. The short carbon fibers are 1 mm to 10 mm long. Preferably, the short carbon fibers are 1 mm to 5 mm long.

For the purpose of this disclosure, carbon fibers with the length 10 mm and longer, e.g. 10 mm, 11 mm, 12 mm, 13 mm, or 14 mm are said to be long carbon fibers. The long carbon fibers have a diameter in the range from 1 to 15 $\mu$M. The long carbon fibers are 10 mm to 20 mm long. Preferably, the long carbon fibers are 10 mm to 15 mm long.

In some embodiments, the electroconductive paper cover sheet of this disclosure comprises the short carbon fibers. In other embodiments, the electroconductive paper cover sheet of this disclosure comprises the long carbon fibers.

At least some of the electroconductive paper cover sheets of this disclosure may comprise a combination of carbon fibers of different length. In some embodiments, the electroconductive paper cover sheet comprises a mixture of the long carbon fibers and the short carbon fibers which may be mixed together in at least the surface paper ply. In other embodiments, the electroconductive paper cover sheet of this disclosure may comprise the surface ply and one or more filler plies beneath the surface ply with the short carbon fibers and/or one or more filler plies beneath the surface ply with the long carbon fibers, and/or one or more filler plies beneath the surface ply with a combination of the short and the long carbon fibers.

At least some carbon fibers may be coated or surface-treated in order to improve the miscibility in a water-based paper stock and further to improve the intermixing of the carbon fibers with cellulose fibers.

At least in some of the embodiments, the electroconductive paper cover sheet may comprise carbon nanotubes which can be used in combination with carbon fibers in the surface ply and/or one or more filler plies as may be needed.

In addition to carbon fibers, the electroconductive paper cover sheet comprises cellulose fibers. Any cellulose fibers typically used in wallboard paper cover sheets may be also suitable for the electroconductive paper cover sheet of this disclosure. Cellulose fibers can be virgin fibers produced from some natural source, such as wood or cotton for example, by chemical and/or mechanical methods. Cellulose fibers can be recycled cellulose fibers obtained by re-pulping recycled paper. Cellulose fibers can be any combination of virgin cellulose fibers and recycled cellulose fibers. Preferred sources for recycled cellulose fibers include old corrugated paper, kraft cuttings and waste newspaper.

In the electroconductive paper cover sheet, the cellulose fibers are the main source of fibers in any ply of the electroconductive paper. It will be appreciated that the total amount of the carbon fibers per one ply may vary and is adjusted as needed in order to produce the electroconductive paper cover sheet with a specified electrical conductivity and an electromagnetic shielding capacity as may be needed for any particular application. The total amount of carbon fibers may be also adjusted by mixing the short and the long carbon fibers and/or using only the long or only the short carbon fibers as may be needed. Typically, if the long carbon fibers are used, a higher electrical conductivity may be achieved with lesser amounts of the carbon fibers in comparison to embodiments in which the short carbon fibers are used.

Preferably, the electroconductive paper cover sheets may comprise carbon fibers in an amount from 2% weight (abbreviated as "wt" in the rest of this disclosure) to 30% wt from the fibers total in a ply, with the remainder of the fibers being cellulose fibers, e.g. virgin and/or recycled cellulose fibers. In some embodiments, the electroconductive paper cover sheets may comprise carbon fibers in an amount from 2% wt to 30% wt of the fibers total in a ply, with the remainder of the fibers being cellulose fibers, e.g. virgin and/or recycled cellulose fibers. In some embodiments, the electroconductive paper cover sheets may comprise carbon fibers in an amount from 2% wt to 20% wt of the fibers total in a ply, with the remainder of the fibers being cellulose fibers, e.g. virgin and/or recycled cellulose fibers. In some embodiments, the electroconductive paper cover sheets may comprise carbon fibers in an amount from 2 wt to 10% wt of the fibers total in a ply, with the remainder of the fibers being cellulose fibers, e.g. virgin and/or recycled cellulose fibers. In some embodiments, the electroconductive paper cover sheets may comprise carbon fibers in an amount from 2% wt to 10% wt of the fibers total in a ply, with the remainder of the fibers being cellulose fibers, e.g. virgin and/or recycled cellulose fibers. In some embodiments, the electroconductive paper cover sheets may comprise carbon fibers in an amount from 2% wt to 5% wt of the fibers total in a ply, with the remainder of the fibers being cellulose fibers, e.g. virgin and/or recycled cellulose fibers. In some embodiments, the electroconductive paper cover sheets may comprise carbon fibers in an amount from 5% wt to 10% wt of the fibers total in a ply, with the remainder of the fibers being cellulose fibers, e.g. virgin and/or recycled cellulose fibers.

If the electroconductive multi-ply paper comprises carbon fibers in one or more filler plies in addition to the surface ply, then an amount of carbon fibers in each of the filler plies may be the same or different. Furthermore, an amount of carbon fibers may be the same or different from an amount in the surface ply. In some embodiments, the surface ply may comprise 5% wt to 10% wt of carbon fibers from the fibers total in the surface ply, while a filler plie(s) may comprise 2% wt to 5% wt of carbon fibers from the fibers total in the filler ply.

In the electroconductive paper of this disclosure, carbon fibers may be incorporated in several different ways. In some embodiments, carbon fibers are intermixed with cellulose fibers evenly through a ply. In these embodiments, the carbon fibers are oriented at random in the ply.

In other embodiments, carbon fibers may be incorporated through a ply in a pattern and create an electroconductive matrix within the ply. Some distribution patterns are such that carbon fibers are oriented in a particular direction, e.g. the carbon fibers oriented parallel or near parallel to each other. If in addition to the surface ply, one or more filler plies comprise carbon fibers, the orientation pattern of carbon fibers between two adjacent plies of a multi-ply paper may be the same or different.

The electroconductive paper of this disclosure can be made by incorporating carbon fibers into various paper grades, including those disclosed in US Patent Publication US 2012/0088114. Suitable paper grades include Manila with a smooth calendered finish and Newslined with a rougher finish. Both paper grades are multi-ply with at least one liner (surface) ply and several filler plies. The Manila liner plies typically use recycled paper from hardwood pulp with shorter fibers as compared to the filler plies in which longer fibers are used. The Newslined paper typically has the same fiber type in its liner ply as that used in its filler plies.

The surface ply which comprises carbon fibers, may further comprise old corrugated containers (OCC) or double lined Kraft (DLK) wastepaper.

Figure 3:
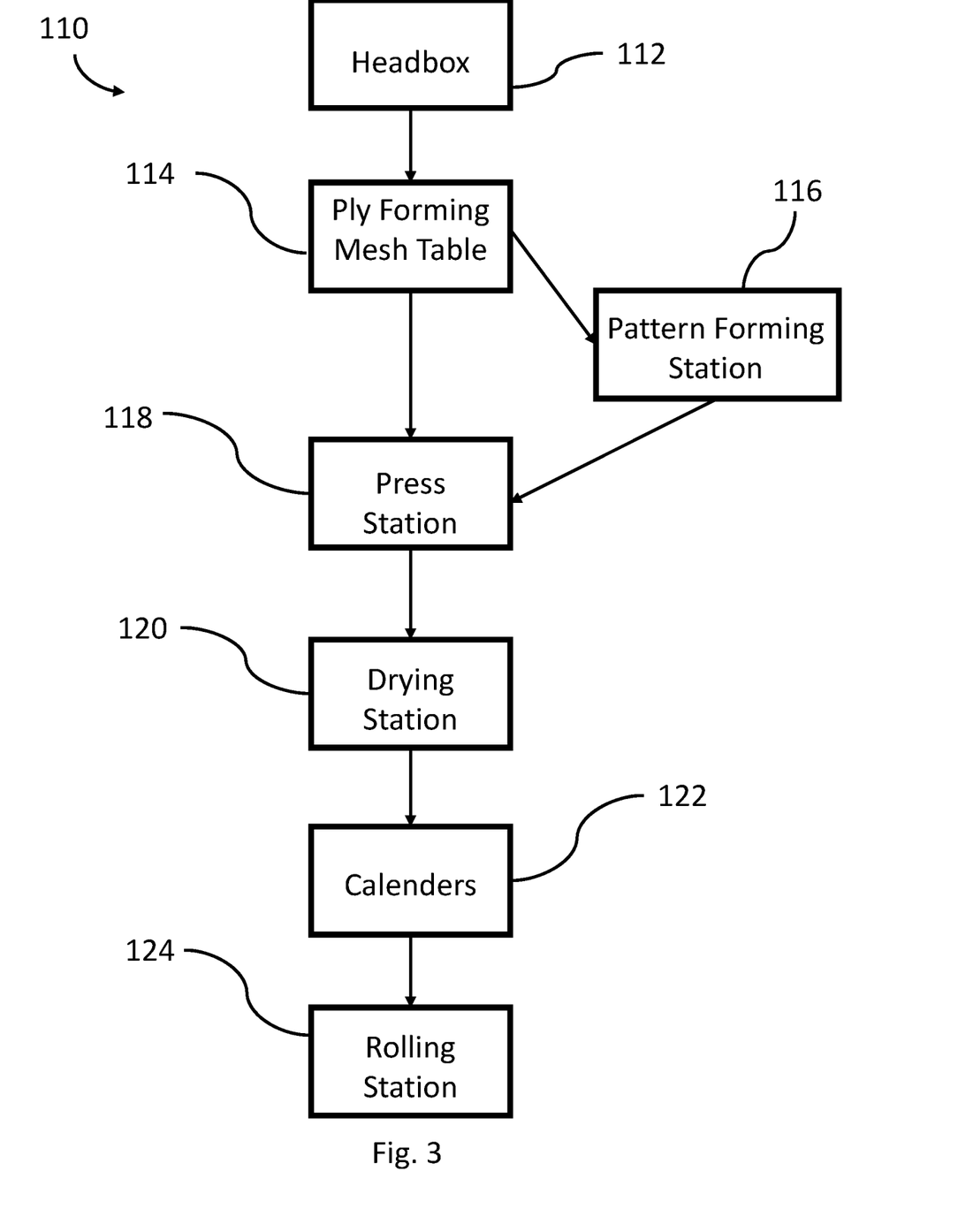
FIG. 3 is a block diagram for a manufacturing process for the electroconductive paper cover sheet comprising carbon fibers.

With reference to FIG. 3, this disclosure further provides methods for manufacturing the electroconductive paper cover sheet of this disclosure. In these methods, a conventional papermaking press with modifications can be used. For example, a Fourdrinier machine or any modification thereof can be used. The press can be further modified as may be needed in order to allow the incorporation of carbon fibers in a pattern in which the orientation of carbon fibers is predetermined. The set up may comprise one or more computer processors with a software which calculates an amount and/or pattern of carbon fibers as may be needed in order to achieve a particular level of electromagnetic shielding with the electroconductive surface to be produced. Thus, the present methods produce the electroconductive paper cover sheets with a pre-determined electromagnetic shielding capacity and as may be needed for any particular application.

FIG. 3 is a block diagram, generally 100, illustrating a method for manufacturing the electroconductive paper cover sheet (14). In a method for making the electroconductive paper cover sheet, a paper stock is mixed. The paper stock is a very diluted suspension of fibers in water. The paper stock comprises water, cellulose fibers, carbon fibers and some other additives. Cellulose fibers can be virgin fibers produced from some natural source, such wood or cotton for example, by chemical and/or mechanical methods, recycled cellulose fibers obtained by re-pulping recycled paper or any combination of virgin cellulose fibers and recycled cellulose fibers.

Preferred sources for recycled cellulose fibers include old corrugated paper, kraft cuttings and waste newspaper. The paper stock may further comprise one or more of the following additives: a sizing agent, a flocculant, a defoamer, a water retention agent, a binder, a filler, a deinking agent, and a pigment. In order to reduce the surface tension of carbon fibers and improve the miscibility of carbon fibers with cellulose fibers in a paper stock, the carbon fibers may be surface-treated or a surfactant can be added to the paper stock.

Suitable surfactants may include, but are not limited to, ionic and non-ionic surfactants with a midrange or high hydrophobic/lipophilic balance ("HLB") from about 10 to about 18. Suitable dispersants may include naphthalene sulfonate and other alkylbenzene sulfonate, lignosulfonate, fatty alcohol ethoxylates and alkylphenol ethoxylates. Other surfactants include alkyl sulfates such as ammonium lauryl sulfate and sodium lauryl sulfate, and the related alkyl-ether sulfates such sodium laureth sulfate and sodium myreth sulfate, alkyl-aryl ether phosphates, alkyl ether phosphates, sodium stearate, quaternary ammonium salts.

Suitable sizing agents may include, but are not limited to, alum, rosin, rosin soup, alkyl ketene dimer and alkenyl succinic anhydride.

Suitable water retention agents may include, but are not limited to, polyacrylamide and polyethyleneimine.

Suitable fillers may include, but are not limited to, calcium carbonate, talc and titanium dioxide.

Suitable binders may include, but are not limited to, styrene maleic anhydride copolymer, styrene-acrylate copolymer and modified starch.

If a multi-ply paper sheet is made by pressing together plies that differ in their chemical compositions, as is the case with filler and liner plies, then separate paper stocks are prepared for such plies. For example, one stock is prepared for the liner plies and another stock is prepared for the filler plies.

An amount of carbon fibers in a paper stock varies and it depends on the requirements for a particular electroconductive surface to be produced. Increasing an amount of carbon fibers and/or using longer fibers aids in producing the electroconductive paper cover sheet with a stronger conductivity.

Typically, a paper stock for the electroconductive paper may comprise from about 2% wt to about 40% wt of carbon fibers, based on the total amount of all fibers by dry weight. For example, if a paper stock is prepared with 95 g of dry cellulose fibers and 5 g of dry carbon fibers, the paper stock is said to have 5% wt of carbon fibers, based on the total amount of all fibers by dry weight.

The composition of cellulose fibers in any particular paper stock depends on a type of plies and/or paper to be produced. Filler plies can be prepared from a hard paper stock which may comprise kraft and boxboard cuttings. Liner plies can be prepared from a paper stock which comprises flyleaf shavings and/or newspaper.

In the block diagram of FIG. 3, a paper stock from a headbox (block 112) is distributed at block (114) onto a forming mesh table which is continuously moving and which is also referred to as the Fourdrinier table of wire, where water is drained and a web for a paper ply is formed. The forming paper ply may already comprise carbon fibers if carbon fibers were mixed with cellulose fibers in a paper stock from which the paper ply is forming. However, some paper plies may be formed from paper stocks which do not comprise carbon fibers.

After block (114), the forming paper ply, which was formed from a paper stock which did not comprise carbon fibers, may be passed to block (116), which is a pattern-forming station, where a set of rolls or some other means can be used to embed carbon fibers in a pattern into the forming paper ply. A pattern means that carbon fibers are oriented in a particular direction, for example carbon fibers may be embedded parallel or near parallel to each other. The pattern-forming station may be operated by a computer equipped with a software which calculates a pattern to be imprinted. In some embodiments, the pattern-forming step can be omitted.

The forming paper ply either directly from block (114) or from block (116) is then subjected to pressing at a press station (block 118) by felt rollers. If a multi-ply paper is to be made, several plies are superimposed together at this stage of the process. The plies are pressed together at block (118). If plies have a different composition of fibers, the plies can be fed to the press station from several different ply forming mesh tables (not shown in the drawing of FIG. 3).

Thus, a multi-ply paper sheet can be formed which comprises several inner filler plies and the surface ply (72) which comprises carbon fibers.

After block (118), the pressed paper is dried in a multi-cylinder drying section (block 120) by being passed through a set of additional felt rollers and driers.

From block (120), the dried paper is passed to calenders at block (122), where the dried paper is calendared for uniformity. After that, the electroconductive paper is rolled into rolls at block (124) and is ready for various applications.

It should be noted that various modifications to the method can be made depending of the application for which the electroconductive paper is to be produced. For example, the electroconductive paper can be coated with a water-resistant coating and/or carbon fibers may be incorporated into one or more filler plies in addition to the surface ply.

In some embodiments, the electroconductive paper can be coated with an adhesive composition on one of the surfaces such that this adhesive layer improvises adhesion of the electroconductive paper to various substrates, such as for example as a concrete wall, gypsum panel, a ceiling tile, metal pipes, wood planks or any other building construction surface which needs to be retrofitted with an electroconductive surface.

In yet further aspect, this disclosure provides methods for producing a construction product comprising an electroconductive surface.

In one embodiment, a wallboard comprising an electroconductive surface is manufactured by using the conventional gypsum board forming methods and equipment. In these embodiments, a gypsum slurry is prepared with calcined gypsum and water. Typically, a gypsum slurry may comprise various other additives which may include, but are not limited to, one or more of the following: a binder, a filler, a defoamer, organic and/or inorganic fibers, foam, a dispersant, a setting retarder, a setting accelerator, a biocide and/a colorant.

Figure 4:
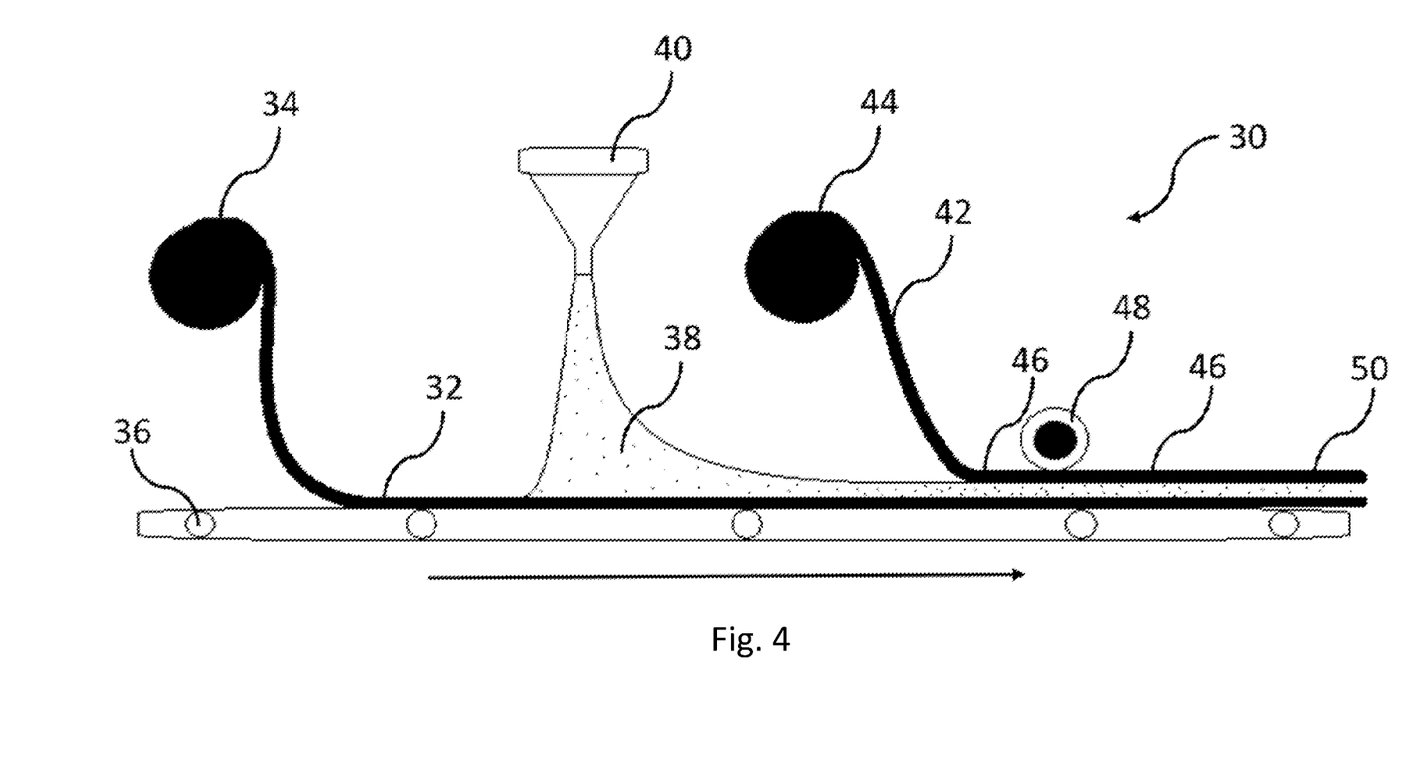
FIG. 4 is a schematic diagram of a continuous manufacturing process for a building construction product comprising an electroconductive surface.

FIG. 4 is a schematic diagram of a manufacturing process of a gypsum wallboard with the electroconductive surface, generally (30). A first paper cover sheet (32) is fed from a roll (34) on a moving conveyor (36). A gypsum slurry (38) is distributed from a mixer (40) onto the first paper cover sheet (32) which in some embodiments is the electroconductive paper cover sheet comprising carbon fibers, as described in this disclosure.

A second paper cover sheet (42) is deposited over the distributed gypsum slurry (38) from a roll (44). If the first paper cover sheet (32) does not comprise carbon fibers, then this second paper cover sheet (44) is the electroconductive paper cover sheet comprising carbon fibers, as described in this disclosure. It should be noted that in some other embodiments, both paper cover sheets (32) and (44) are the electroconductive paper cover sheets comprising carbon fibers.

Typically, the paper cover sheets (32) and (44) are multi-ply paper cover sheets. When the cover sheet (32) and/or the cover sheet (44) comprises carbon fibers, the carbon fibers are typically incorporated at least the surface ply of the cover sheets (32 and/or 44) which is remains a free surface opposite to the surface of cover sheet (32 and/or 44) in contact with the gypsum slurry (38). However, at least in some embodiments, the gypsum slurry can be put in connect with the surface ply comprising carbon fibers.

A forming wallboard (46) is then passed through a forming station with forming means, e.g. a roll (48), where the distribution of the gypsum slurry (38) between the first paper cover sheet (32) and the second paper cover sheet (42) is evened by the forming means, and the forming wallboard (46) of pre-determined thickness is formed. As the formed wallboard (46) leaves the forming station (48), the formed wallboard is continuously moving on the conveyor (36) in a direction denoted by an arrow shown under the conveyor 36, the gypsum slurry (38) sets and the wallboard with the electroconductive surface (50) is produced. The wallboard (50) is then cut to size and dried in a dryer, e.g. kiln.

In yet another embodiment, this disclosure provides a method for imparting an electroconductive surface to a building construction product. The building construction product can be any of the conventional wallboards, fiberboards, tiles, ceiling tiles, windows, floor panels, doors, pipes, planks, frames, or any other construction product with at least one surface. The electroconductive paper cover sheet comprising carbon fibers of this disclosure can be attached to a surface of the building construction product.

In some of these embodiments, the self-adhesive premade electroconductive paper cover sheet of this disclosure can be used and/or the electroconductive paper cover sheet of this disclosure can be coated with an adhesive and then applied over the surface of the construction product. This method can be practiced on surfaces of the construction products that have been already installed.

Further methods of this disclosure include shielding an area, e.g. a room, a set of rooms, a portion of a building, or a building from electromagnetic waves. In these methods, the area is enclosed with the electroconductive paper cover sheets.

In further embodiments, construction products with electroconductive surface comprise an electroconductive paper screen which may be foldable. The electroconductive paper screen comprises the electroconductive paper cover sheet of this disclosure and one or more hanging means. The hanging means may include one or more planks, e.g. plastic, metal or wooden planks, which can be assembled together to create a frame to which the electroconductive paper screen is then adhered. In addition, or instead, the handing means may include wires, self-adhesive strips, ropes and/or some adhesive. The electroconductive paper screen may be suspended from a ceiling, a wall, a window frame, a door frame, a wall frame and/or the electroconductive paper screen can stand alone propped by a frame. The electroconductive paper screen can be used to create an enclosure in a portion of a room. This enclosure can shield from electromagnetic waves a portion of a room, for example, when some equipment sensitive to electromagnetic waves needs to be protected.

The electroconductive paper of this disclosure can be used in various applications. One application is to create various enclosures that shield from electromagnetic waves. This can be used in order to block transmission of radio waves including wifi signals or in order to secure communication only via particular waves authorized in the enclosure.

The building construction products of this disclosure comprise the electroconductive surface created by the electroconductive paper cover sheet. This electroconductive surface can be used for blocking electromagnetic waves and/or as an electromagnetic signature (a signal to be detected with one or more detectors) for navigation, including indoor navigation, when an electric field is applied to the electroconductive surface. The electroconductive surface can also provide a touch sensitivity when an electric field is applied to it.

Example 1

3 different types of electroconductive papers were produced.
1) OCC 70%: Carbon Fiber 3 mm 30% (Basis weight-28 lb/msf; msf means 1000 sq ft)
2) OCC 80%: Carbon Fiber 3 mm 20% (Basis weight-28 lb/msf)
3) OCC 90%: Carbon Fiber 12 mm 10% (Basis weight-26 lb/msf)

All papers were single ply. The samples were formed on the Williams Standard Pulp Test Apparatus using a 100 mesh screen.

Example 2

The resistance of the electroconductive paper samples from Example 1, was measured using a Fluke 115 True RMS Multimeter. The electroconductive papers 1, 2, and 3 had the following dimensions: approximately 8 inches by 4 inches.

The output is reported in kilo ohms. 1 kilo ohm=1000 ohms. Conventional wallboard paper was used for comparison. Imgne X3 Graphene Enhanced Conductive Geotextile was used as a positive control.
1) OCC 70%: Carbon Fiber 3 mm 30% (Basis weight-28 lb/msf; msf means 1000 sq ft)=0.006 kilo ohms
2) OCC 80%: Carbon Fiber 3 mm 20% (Basis weight-28 lb/msf)=0.010 kilo ohms
3) OCC 90%: Carbon Fiber 12 mm 10% (Basis weight-26 lb/msf)=0.030 kilo ohms
4) Imgne X3 Graphene Enhanced Conductive Geotextile; vendor sample (www.imgne.com)=1.095 kilo ohms
5) Conventional SHEETROCK wallboard paper=infinite resistance The electroconductive paper samples had resistance from 0.006 kilo ohms (sample 1) to 0.030 kilo ohms (sample 3), while conventional wallboard paper without carbon fibers had the infinite resistance. This result suggests that the conductivity of the electroconductive paper cover sheet can be regulated on demand by varying the length and/or the amount of carbon fibers in the paper cover sheet.

What is claimed is:

1. A building construction product with an electroconductive surface, the building construction product comprising a gypsum core with one or more surfaces covered by an electroconductive paper cover sheet comprising carbon fibers, the electroconductive paper cover sheet being attached to the one or more surfaces of the gypsum core, wherein the electroconductive paper cover sheet is a multi-ply paper comprising a surface ply and the carbon fibers are incorporated in the surface ply, and the carbon fibers are incorporated in the surface ply in an amount from 2% wt to 5% wt of fibers total per the ply, and wherein the remainder of the fibers in the ply are cellulose fibers, and wherein the surface ply is the furthest away from the gypsum core and does not come in contact with the gypsum core.

2. The building construction product of claim 1, wherein the building construction product is a wallboard, a fiberboard, a ceiling tile, a floor tile, a door, a plank, a frame or a roof tile.

3. The building construction product of claim 1, wherein the building construction product is a wallboard having two long surfaces, and the electroconductive paper cover sheet comprising carbon fibers is applied over at least one long surface of the wallboard two long surfaces.

4. The building construction product of claim 1, wherein the carbon fibers are long carbon fibers, short carbon fibers or any mixture thereof.

5. The building construction product of claim 1, wherein the carbon fibers are incorporated in the surface ply of the electroconductive paper cover sheet in a pattern.

* * * * *